Patented Apr. 7, 1953

2,633,788

UNITED STATES PATENT OFFICE 2,633,788

CONTROL FOR REVERSIBLE AGRICULTURAL IMPLEMENTS

Noral A. Nelson, Detroit, Mich., assignor to Harry Ferguson, Inc., Detroit, Mich., a corporation of Delaware Application September 30, 1949, Serial No. 118,762

11 Claims. (Cl. 97—26)

This invention relates to controls for implements having a plurality of working conditions and more specifically to mechanisms controlling the shifting of an implement from one working condition to another. The implement so controlled may be a soil-working implement such as a two-way plow.

An object of the invention is to provide improved controls for implements of the above class such that a given act performed successively on an implement will change the implement from one working condition to the other and then back to the original condition. Such an implement and its control may be connected to a tractor having a power lift means so that the aforesaid given act performed successively on the implement may be the lifting and lowering of the implement with respect to the tractor.

The power lift means on the tractor may take any suitable form, such for example as that disclosed in the Ferguson Patent No. 2,118,180, dated May 24, 1938, by which the implement is moved between working and transport positions and is automatically adjusted with respect to the tractor in maintenance of a given condition of operation such as substantially uniform ground pull upon the implement.

A further object is to provide new and improved mechanism as part of the control for selectively predetermining the alternate character of the change-over from one working condition to the other.

Other objects and advantages of the invention will become apparent as the following description proceeds, taken in connection with the accompanying drawings, in which.

Figure 1:
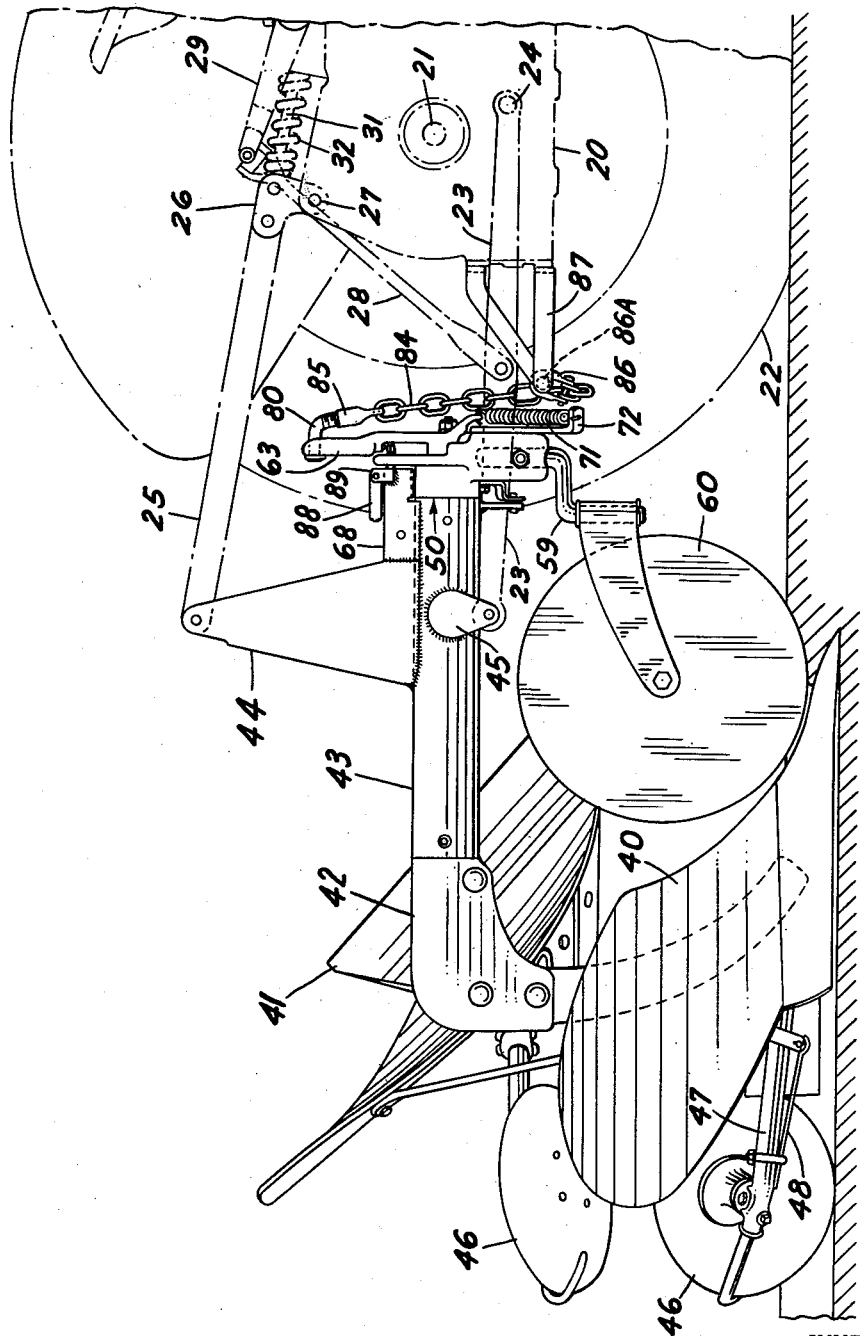
Figure 1 is a side elevation of the rear portion of a tractor and attached implement embodying the features of the invention, the implement being shown in ground-engaging or operating position.
Figure 2:
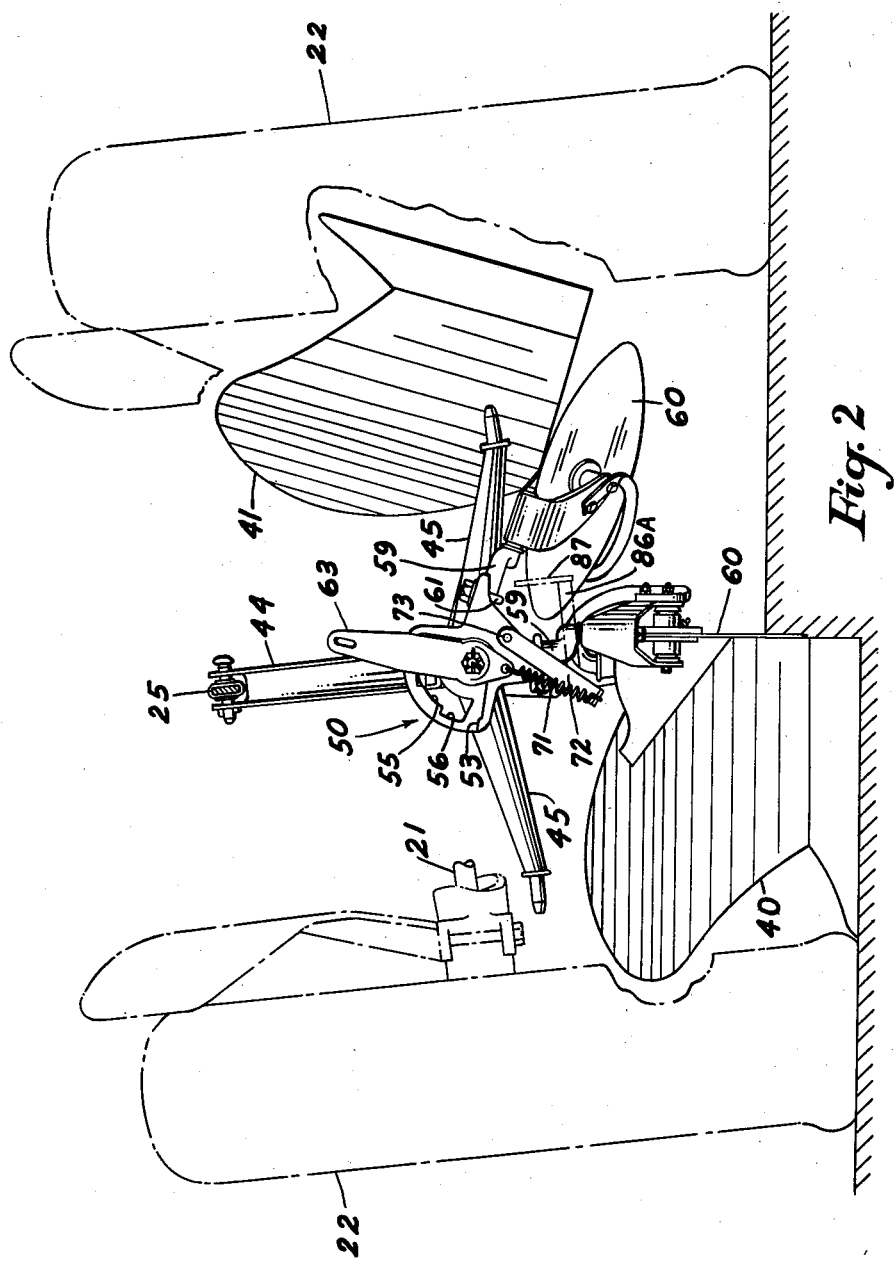
Fig. 2 is a front view of the implement, the dotted portion of the tractor being shown simply for reference purposes.

Although the invention is susceptible of various modifications and alternative constructions and uses, I have shown in the drawings and shall herein describe in detail the preferred embodiment of the invention. It is to be understood, however, that I do not intend to limit the invention by such disclosure, but intend to cover all modifications and alternative constructions and uses falling within the spirit and scope of the invention as expressed in the appended claims.

As shown in Fig. 1, the tractor with which the exemplary implement is associated has a body 20, a rear axle 21, and rear drive wheels 22. It is equipped with a system for lifting which, as more fully disclosed in the aforementioned Ferguson patent, comprises a pair of forwardly converging lower links 23 pivoted at their forward ends as indicated at 24 on the tractor body 20 below and slightly forward of the rear axle 21, and an upper control link 25 pivotally connected at its forward end to rearwardly projecting arms of a rocker or clevis 26 pivoted at 27 on the tractor body 20. The lower links 23 are connected by drop links 28 with power-actuated crank arms 29 pivoted on the tractor body. The power means ordinarily provided for actuating the crank arms is of the hydraulic-ram type and is mounted in or on the tractor body. Control of the operation of the hydraulic ram is effected through the medium of a control valve (not shown) adapted to be shifted manually in well known manner or automatically in accordance with the draft load on the implement as reflected by the position of a control rod 31. In the particular control organization shown, the rod 31 is connected between the rocker 26 and the control valve and is yieldably retained in a central or neutral position by a spring 32 surrounding the rod. Movement of the rod 31 in one direction or the other from its neutral position as a result of changes in force applied to the upper link 25 by the implement initiates the operation of the ram so that links 23 and implement attached thereto will be raised or lowered in conformance with variations in draft load exerted by the implement. By appropriate manual setting of the control valve, the implement may be raised to transport position or lowered to ground-engaging or working position.

The implement of the present invention is illustrated by way of example as a two-way or reversible plow having right and left-hand plow units or bases 40 and 41 carried adjacent the rear end of a beam or carrier 42 extending longitudinally with respect to the tractor. The beam 42 is rotatably mounted in a support, herein shown as an elongated tubular housing 43 having an upright bracket 44 to which the upper link 25 is connected and oppositely extending arms 45, to which the lower links 23 are connected. Associated with each plow unit is a furrow wheel or running landside 46, preferable of the type disclosed in Ferguson Patent No. 2,195,515 and including a bracket 47 projecting rearwardly from a pivotal connection with the plow unit so that the furrow wheel is adapted to rock in a plane generally parallel to the landside of the plow unit. A heavy leaf spring 48 yieldably urges the bracket downwardly to maintain the furrow wheel in a ground-engaging position. The plow units 40 and 41 are spaced from one another circumferentially of the axis of the beam 42, in this instance somewhat less than 90°, so that when one unit is positioned for operation, the other is disposed in an inoperative position. Selective positioning of the plow unit may thus be effected by rocking the beam about its axis. A plow of generally similar construction is disclosed and claimed in my copending application Serial No. 85,646 filed April 5, 1949.

Associated with the forward end of the beam 42 is mechanism by which the beam may be rocked to locate either plow unit 40 or 41 in operative position and lock it in such position pending another positioning action. This mechanism includes a rocker member 50 rigid with the beam, a latch member 67 cooperating therewith to locate the beam in either of two operative positions, and an actuator member 63 operative to release the latch member and to cooperate with the rocker member 50 in turning the beam from one operative position to the other.

In the exemplary implement the forward end of the beam 42, which is in the form of a longitudinal bar, has a reduced end portion 49 (Fig. 3) upon which the rocker member 50 is nonrotatably secured through the medium of a hub portion 51. This hub portion is rotatably fitted into the forward end of the housing 43 and serves to journal the forward end of the beam in the housing. Extending laterally from one end of the hub 51, in this instance in an upward direction, is an arcuate flange 52 (Fig. 4) provided at opposite sides with forwardly projecting abutments 53 and 54 for cooperation with the actuator member 63 as will be described presently.

Formed in the flange 52 between the abutments 53 and 54 is an arcuate slot for the accommodation of the latch member 67. Downwardly facing recesses 56 and 57 at opposite ends of the slot receive the latch member in the respective operative positions of the beam whereby the latter is locked against rotation and consequently one or the other of the plow units is securely retained in operating position.

Also integrally formed with the hub 51 are a pair of depending arms 58 upon which are mounted spindles 59 for coulters 60. The arms are spaced apart circumferentially of the beam similar to the spacing of the plow units 40 and 41, thus locating the coulters for cooperation with the plow units. To permit convenient adjustment of the coulters the spindles are secured to the arms as by U-bolts 61.

The actuator member 63 as herein shown comprises an elongated lever arm having a hub portion 63a at one end journaled on a reduced axial extension 62 of the beam 42. A nut 64 threaded on the end of the extension retains the actuator member in place thereon. As will be seen by reference to Fig. 4 the actuator member is disposed between the abutments 53 and 54 and is engageable with them alternately when swung to the left or the right from an intermediate generally central upright position such as that in which the actuator member is shown in that figure.

Figure 3:
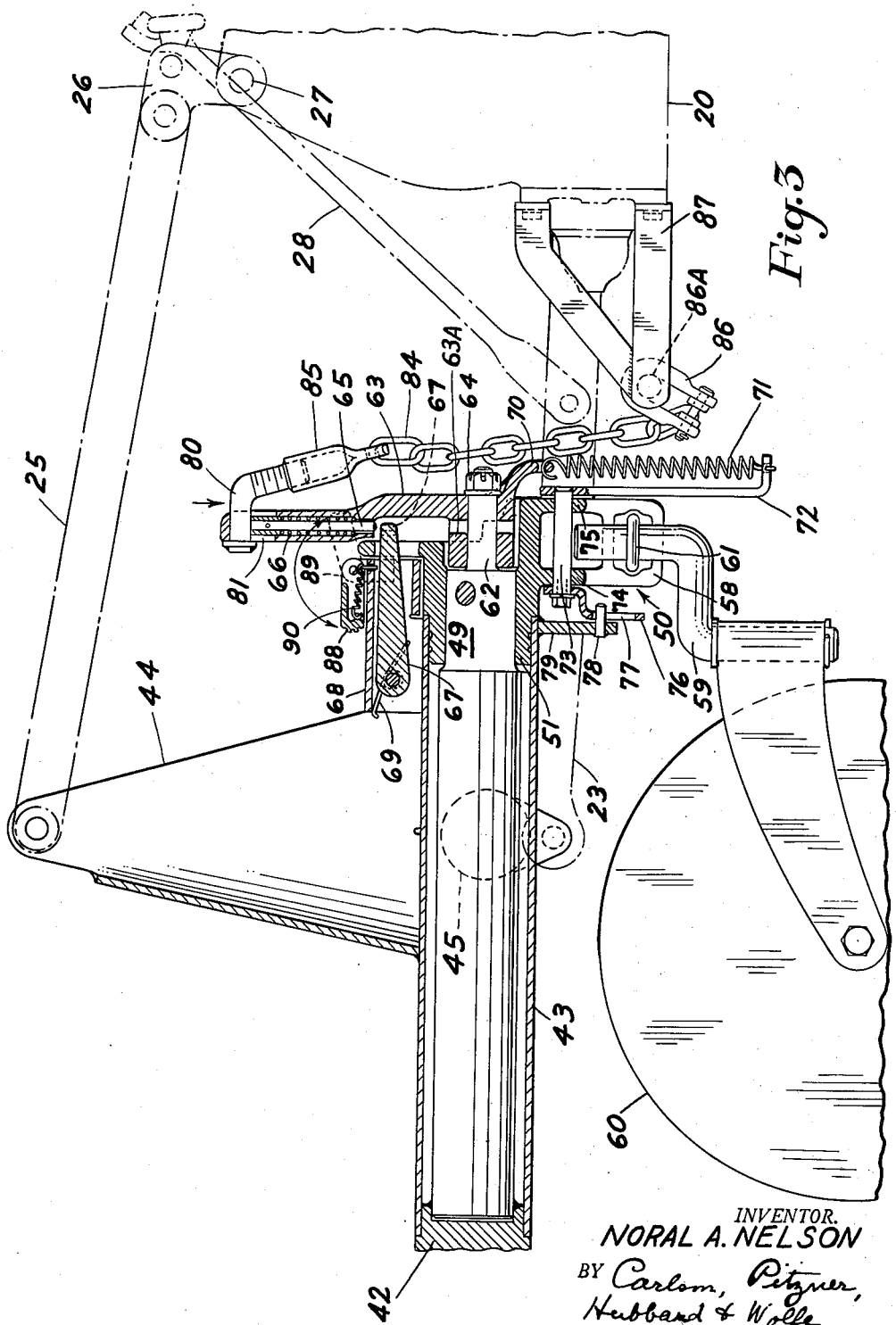
Fig. 3 is a fragmentary longitudinal sectional view of the implement and the portion of the tractor to which the implement is attached.
Figure 5:
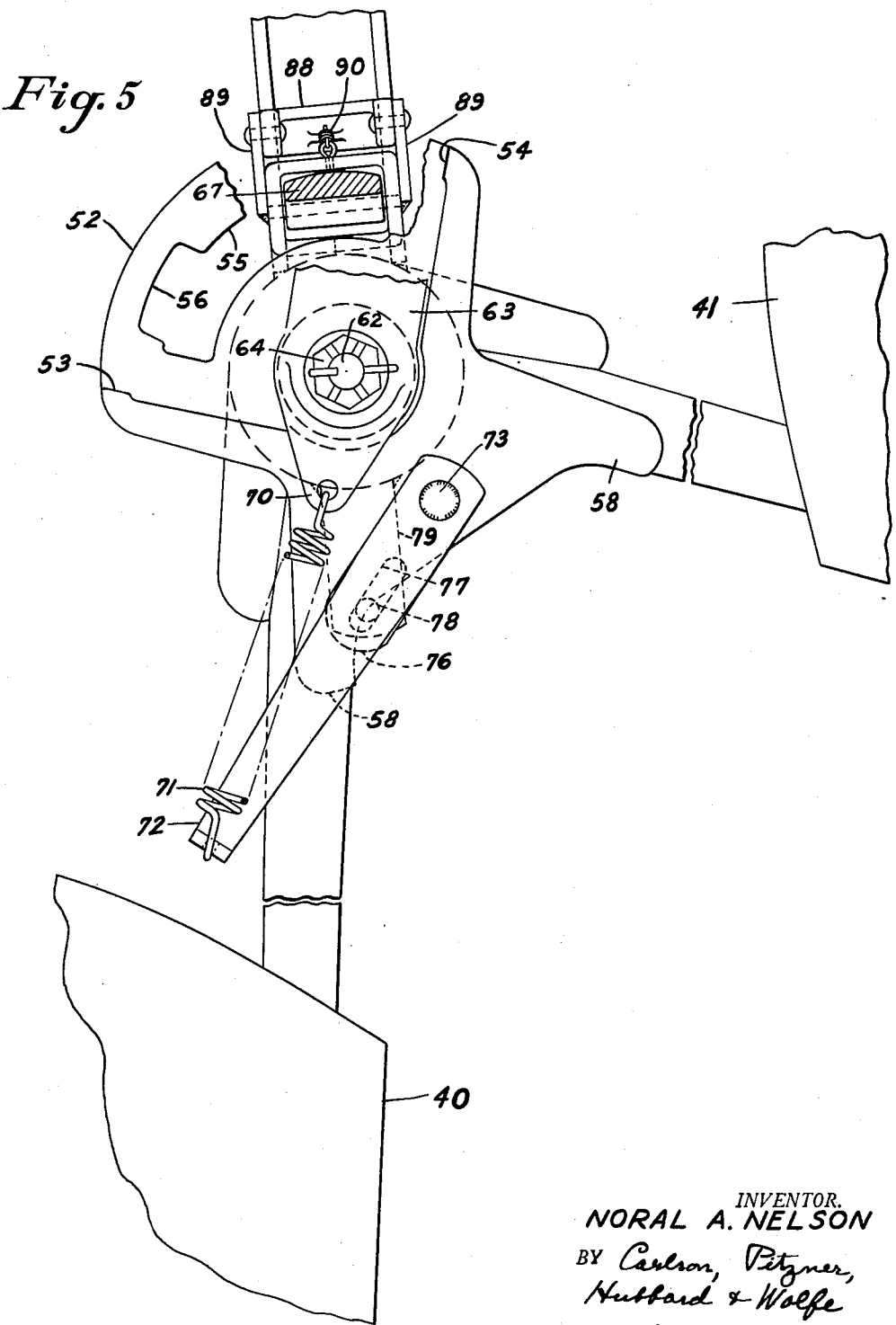
Fig. 5 is a similar front view of a portion of the implement with parts broken out and in section.

As indicated above, the latch member 67 is positioned to enter one or the other of the locking recesses 56 and 57 according to the particular plow unit positioned for operation. The latch members as shown in Figs. 3 and 5 comprise an elongated lever pivotally supported at one end in a hollow bracket 68 secured to the top of the housing 43 forwardly of the bracket 44. The free end or nose portion 67a of the latch member projects through the slot 55 in the rocker member and a spring 69 acting on the latch member urges such nose portion upwardly into one or the other of the recesses when the associated plow unit is positioned for operation.

When the positions of the plow units are to be reversed or interchanged, the latch member is forced out of the recess and into the arcuate slot 55, thus freeing the beam 42 and the rocker member 50 for rotative movement. Disengagement of the latch member is effected in this instance by means of a plunger 65 slidably mounted in the actuator member 63 in overlying relation to the forward end of the latch member. The plunger is urged upwardly or away from the latch member by a spring 66 and is adapted to be moved downwardly incident to the operation of the actuator as will appear presently.

In accordance with the invention, simple but reliably acting means is provided for returning the actuator member 63 to its intermediate or upright position after each operation and for predetermining the direction of its next movement. This means in its preferred form comprises a coil spring 71 anchored on one end to a portion 70 of the actuator member extending downwardly with respect to the pivotal axis of that member. The other end of the spring 71 is anchored to the laterally bent end portion of a link 72 adapted to swing about an axis parallel to the pivotal axis of the actuator member so that the anchorage point of the spring may be shifted to either side of a vertical plane through that pivotal axis. Thus, depending upon the position of the link 72, the actuator member is biased toward one or the other of the abutments 53 or 54 and is constrained to move in the direction of that abutment when a generally downwardly directed pull is exerted on its upper end.

As shown in Fig. 3, the link 72 comprises an elongated flat bar having a pivot pin 73 rigidly secured to the end remote from the anchorage point of the spring 71. The pin is received in apertures formed in spaced depending flanges 74 and 75 integral with the rocker member 50 and in this instance connecting the depending arms 58. Rigidly secured to the outer or rear end of the pin 73 for pivotal movement conjointly with the link 72 is an arm 76. The free end of this arm, which extends generally parallel to the link 72, is formed with a longitudinal slot 77 adapted to receive a pin or stud 78 projecting forwardly from a depending flange-like portion 79 of the housing 43. It will be observed that the fixed stud 78 is offset further from the axis of the beam than the pivot pin 73. Consequently when the beam is rocked in one direction the link 72 will be positively rocked in the opposite direction.

Operation of the actuator member 63 to selectively position the plow units 40 and 41 is effected through the medium of a connection between the member and the tractor with which the implement is associated. More particularly, provision is made for rocking the actuator member about its pivotal axis in one direction or the other as determined by the setting of the link 72 in response to the raising of the implement toward or to transport position. When the implement is lowered to working position the actuator member is returned to upright position and the selecting means is reset for the next adjusting or plow-positioning operation.

Figure 4:
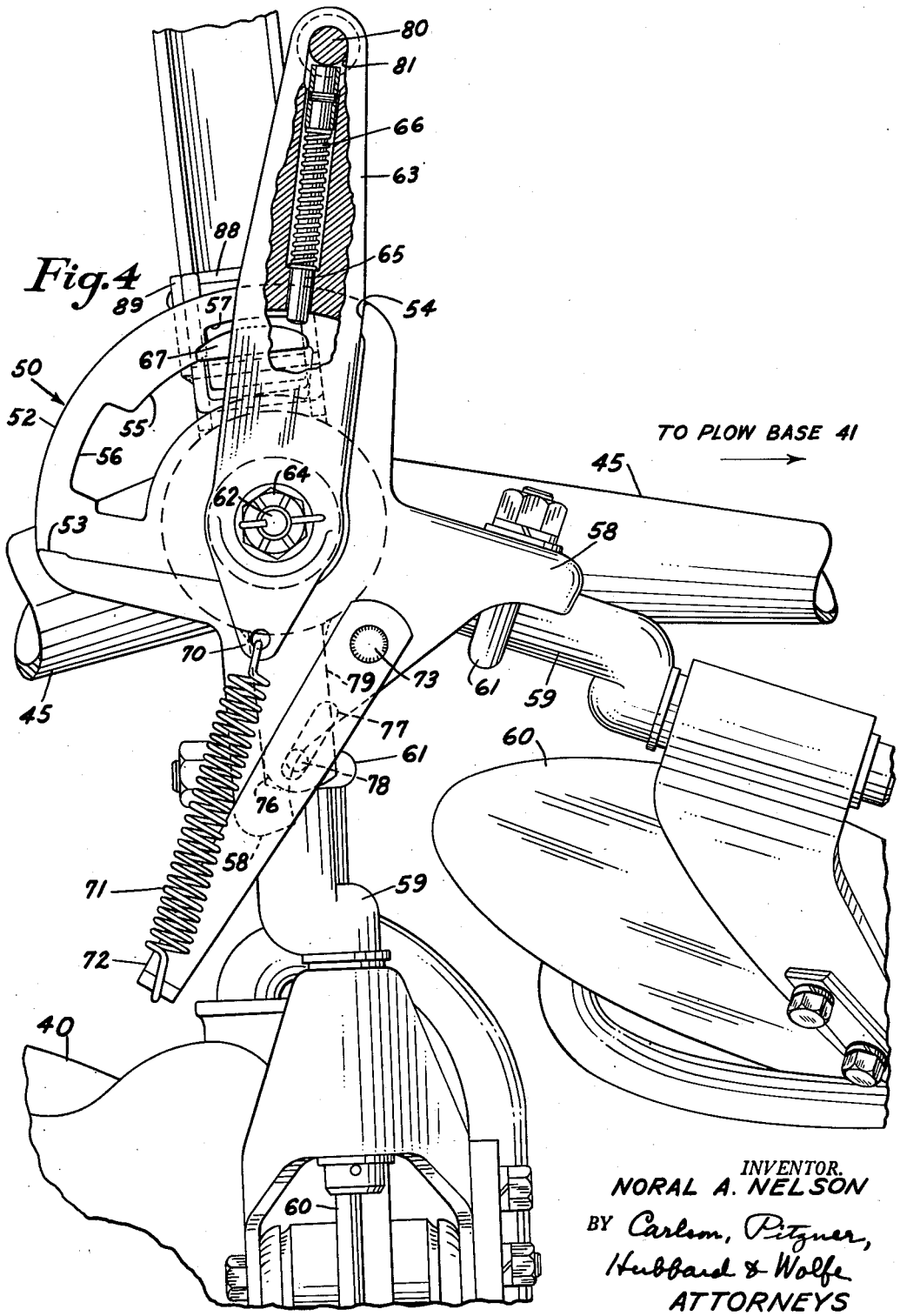
Fig. 4 is a front view of a portion of the implement with parts in section.

The connection by which the actuator member 63 is operated includes a flexible member such as a chain 84 having a coupling 85 at one end adjustably threaded on an L-shaped headed connecting member 80 working in a slot 81 in the actuator member. The chain 84 terminates at its other end in a clevis 86 which embraces a transverse rod 86a carried between laterally spaced brackets 87 rigid with and projecting rearwardly from the tractor body 20. As shown in Figs. 3 and 4, the plunger 65 underlies the connecting member 80 and normally urges it into the upper end of the slot 81. When a downward pull is exerted on the chain 84 the connecting member acts initially to depress the plunger 65 and thereby disengage the latch 67 as previously explained. Further pull on the chain after the member 80 reaches the lower end of the slot is effective to rock the actuator member 63 about its pivot.

Figure 6:
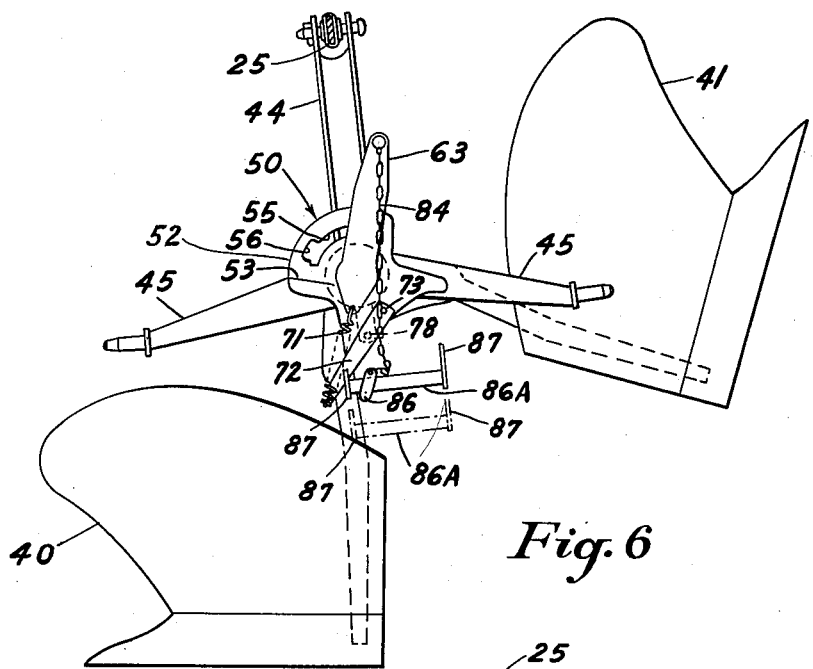
Fig. 6 is a front view of the implement in the same position as Figs. 4 and 5 showing the relationship to a tractor-attached bracket through which the implement is controlled.
Figure 7:
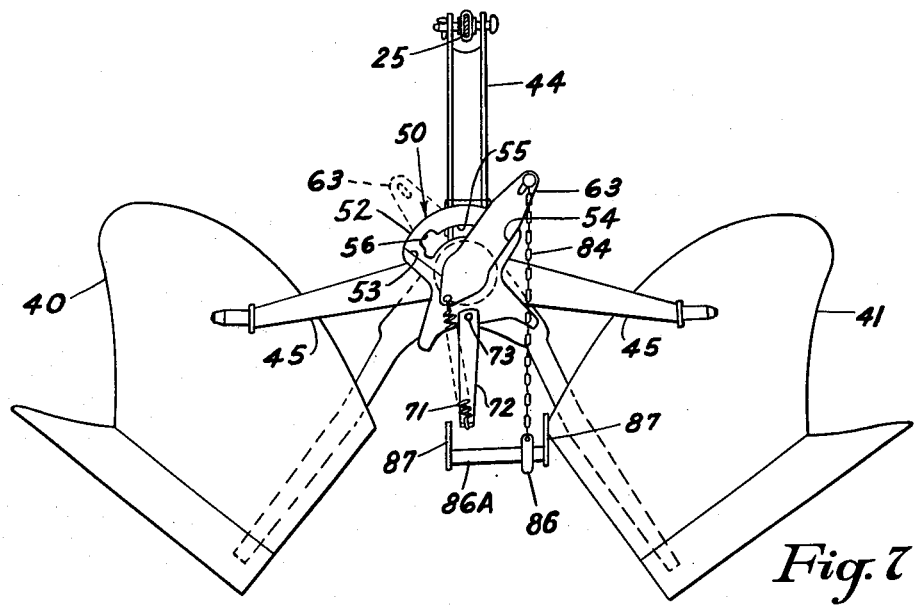

The operation of the improved actuating and selecting mechanisms will be readily understood by reference to Figs. 4–9 of the drawings. As seen in Figs. 4, 5 and 7, the left-hand plow unit 40 is shown in operating or ground-engaging position, and the right-hand plow unit 41 is in inoperative or raised position. The right-hand abutment 54 on the rocker member 50, which is rigid with the plow beam 42, is in a relatively vertical position, and the actuator member 63 is biased into contact with the abutment 54 by the spring 71. This bias was established in the preceding positioning operation by the rocker member 50 moving the pin 73 and the upper end of the link 72 to the right of the fixed stud 78, thereby causing the lower spring-connected end of the link 72 to pivot about the fixed stud 78 to the left thereof. There is slack in the chain 84 at this time (see Fig. 3).

When it is desired to reverse the position of the plow units, the hitch links 23 of the tractor are raised. During the initial part of the raising movement as the slack in chain 84 is being taken up, plow unit 40 is merely lifted from the ground. The slack in the chain is taken up when the position of the tractor-attached rod 86 with respect to the plow assembly shifts from the full-line position in Fig. 6 to the dash-dot position. Upon further upward movement of the implement, the chain 84 pulls down the plunger 65 of the actuator member 63 thus depressing the latch 67 from recess 57. Thereafter the chain acts to swing the actuator clockwise against the abutment 54 whereby the rocker member 50 is swung clockwise with the latch 67 riding through the slot 55. The plow units 40 and 41, which are attached to the member 50 through the beam 42, are likewise swung clockwise moving from the position shown in Fig. 6 through that of Fig. 7 to that shown in Fig. 8.

Figure 9:
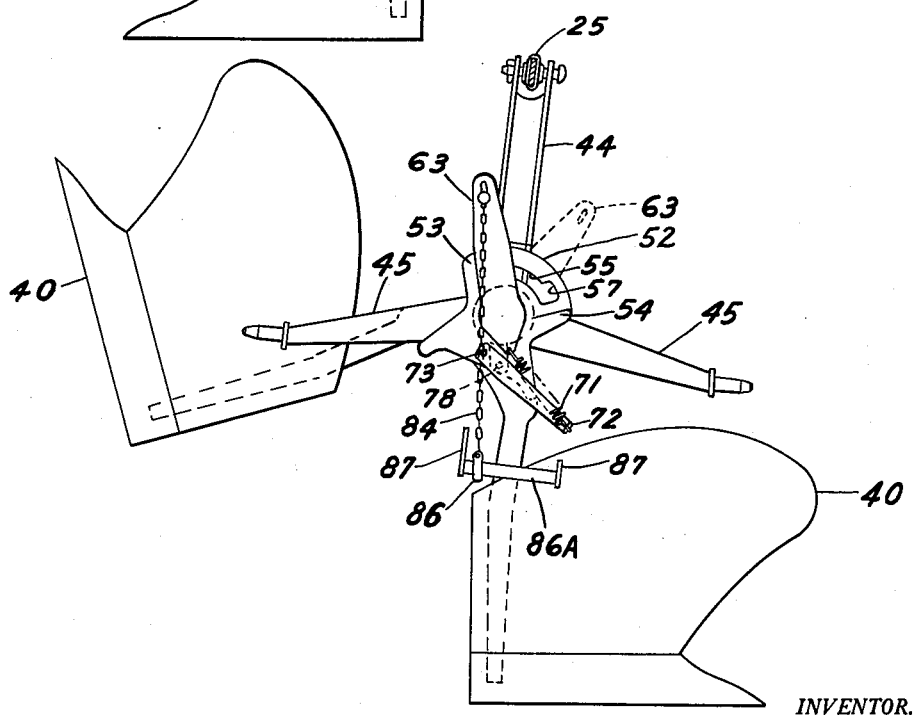
Figs. 7, 8 and 9 are views similar to Fig. 6, but showing the implement in different positions.
Figure 8:
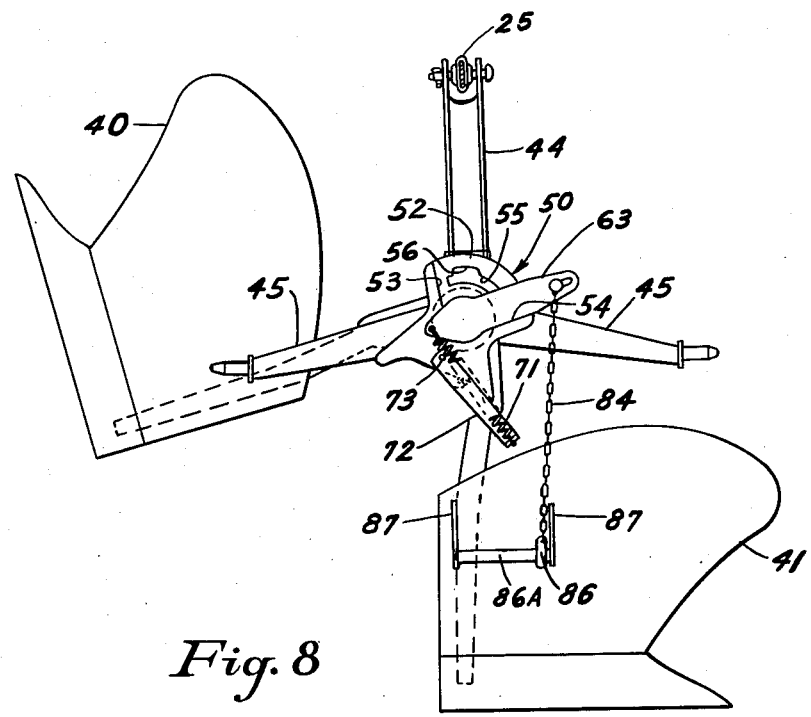

Gravity aids the movement of the beam and plow units from the Fig. 6 position to the Fig. 7 position and resists the movement from the Fig. 7 position to the Fig. 8 position. When the latter position is reached, the rocker member 50 has moved far enough for the slot 56 to reach the latch 67, which snaps into the slot, locking the plow units against further advance or return to the positions of Figs. 6 and 7. During the aforesaid movement, the pin 73 on the upper end of the link 72 has been moved to the left of the fixed stud 78, causing the lower end of the link 72 and the spring 71 to be pivoted to the right of the stud. Now when the tractor hitch links 23 are lowered to bring the right-hand plow 41 to the ground, the spring 71 biases the actuator 63 to the left against the abutment 53 on the rocker member 50 now in its relatively vertical position, as shown in Fig. 9 in which the right-hand plow 41 is in the ground. Since the actuator is biased to the left, the next raising of the plow assembly through the hitch links 23 will cause the tractor-attached rod 86a to make the chain 84 pull the actuator downward counterclockwise, bringing the plow base 40 back to operative position.

It will be evident from the foregoing that the action of the link 72 and spring 71 always biases the actuator member 63 toward the abutment located in a position corresponding to the plow unit in inoperative position and thus effectively predetermines the direction of movement of the actuator in the next positioning operation. As the link is pivoted on a part rigid with the plow supporting beam 42, that is, on the rocker member 50, and is operatively connected with a stationary part of the implement structure through the stud 78 and arm 76, the selecting movements of the link are effected in a positive manner which insure proper operation at all times.

Attention is directed to the fact that, as shown in Fig. 3, the clevis 86 has a depth or length substantially greater than the thickness of the tractor-attached rod 86a and that the rod has a length transverse to the tractor along which length the clevis may slide. Thus as the implement is being raised and the slack taken up in the chain 84, the clevis 86 may slide along the rod transversely of the pivot of the actuator member 63 and always engage the rod perpendicularly or nearly so below the connection of the chain 84 with the actuator member 63 when the chain becomes tight. Accordingly, the chain will always swing the actuator around in the direction in which it is biased.

With the parts operating in the manner above described, each raising of the implement to transport position will reverse the plow units. It may be desirable on occasion to raise the implement without reversing the plow units. To permit this to be done, provision is made for rendering the actuating and selecting mechanisms temporarily inactive or unaffected. For this purpose there is provided a lockout member 88 (Figs. 1 and 3) adapted to be interposed in the path of the actuator member 63 to interrupt its return to upright position by the spring 71 and thus prevent the usual selective biasing of the member. The lockout member 88, as herein shown, comprises a short finger or lever pivoted between ears 89 upstanding from the bracket 68 immediately behind the rocker member 50. A spring 90 acts to retain the lockout member either in the full-line position shown in Fig. 4 in which it is out of the way or in the dotted-line position in which it rests against the edge of the flange 52 of the rocker member 50 and projects into the path of the actuator 63.

When it is desired to prevent reversing of the plow units, the lockout member is snapped forwardly to its dotted-line or active position while the actuator is away from normal rest position, that is, when the implement is in a raised or partially raised position. For example, when the actuator member 63 is moved from the full-line position of leftward bias in contact with abutment 53 as shown in Fig. 9 to the dotted-line position of rightward bias, and the lockout member 88 is snapped forward to the active position, return of the actuator to the full-line position of Fig. 9 is prevented. When the implement is raised the next time, the actuator 63 is moved to the right from its dotted position, eventually contacting the abutment 54 without effect on the relative position of the plow units. A similar lockout may be effected when the plow units are positioned as shown in Fig. 6. The actuator is moved to a position of leftward bias, and the lockout member 88 is snapped forward to keep the actuator biased to the left. Accordingly, the left-hand plow unit 40 remains in operative position, and the right-hand unit 41 remains inoperative when the implement is raised.

I claim as my invention:

1. In an agricultural implement, in combination, a carrier supporting a pair of tools spaced apart so that either tool may be located in an operative position and the other in an inoperative position by rocking the carrier about an axis, a support for said carrier, an actuator member supported to rock in either direction from a generally central upright position and operative to impart corresponding movements to said carrier, means for returning said actuator member to its upright position after being rocked in either direction and for predetermining the direction of its next movement comprising a rigid link pivotally supported at one end on said carrier and having an operative connection with said support in offset relation to its pivotal axis, and a spring connected between the other end of said link and said actuator member.

2. In an agricultural implement, in combination, a carrier supporting a pair of tools spaced apart so that either tool may be located in an operative position and the other in an inoperative position by rocking the carrier about an axis, a support for said carrier, an actuator member supported to rock in either direction from a generally central upright position and operative to impart corresponding movements to said carrier, means operative when said actuator is in its upright position for biasing it for movement in a direction to rock the inoperative tool to operative position, said biasing means comprising a link pivotally supported at one end on said carrier, a spring connected between the other end of said link and said actuator, and means on said support restraining the intermediate portion of said link from lateral movements whereby said one end is swung to opposite sides of the axis of said actuator as said carrier is rocked between its alternate positions.

3. In an agricultural implement, in combination, a carrier supporting a pair of tools spaced apart so that either tool may be located in an operative position and the other in an inoperative position by rocking the carrier about an axis, a support for said carrier, an actuator member supported to rock in either direction from a generally central upright position and operative to impart corresponding movements to said carrier, means operative when said actuator is in its upright position for biasing it for movement in a direction to rock the inoperative tool to operative position, said biasing means comprising a link pivotally supported at one end on said carrier, a spring connected between the other end of said link and said actuator, and means rigid with said support operative to confine said link to pivotal and endwise movements relative to a point on the support whereby said one end is swung to opposite sides of the axis of said actuator as said carrier is rocked between its alternate positions.

4. In an agricultural implement, in combination, a support, a carrier rockably mounted on said support, a pair of circumferentially spaced tools mounted on said carrier, a rockable actuator, means associated with said carrier defining a pair of abutments spaced apart similarly to said tools and positioned on opposite sides of said actuator, means effective to bias said actuator toward one of said abutments when the correspondingly disposed tool is in its inoperative position and to bias the actuator toward the other of said abutments when that tool is in its operative position, said biasing means comprising an elongated member having an operative connection with said support permitting pivotal and lengthwise movement of the member relative to a point on the support spaced from the axis of said carrier, means pivotally connecting said member with said carrier at one side of the carrier axis, and a spring connected between said member and said actuator, the points of connection of said member with said carrier and said spring being located at opposite sides of its operative connections with said support.

5. In an agricultural implement, in combination, a support, a carrier rockably mounted on said support, a pair of circumferentially spaced tools mounted on said carrier, a rockable actuator, a rocker member rigid with said carrier, said rocker member having a pair of abutments spaced apart similarly to said tools and positioned on opposite sides of said actuator, means effective to bias said actuator toward one of said abutments when the correspondingly disposed tool is in its inoperative position and to bias the actuator toward the other of said abutments when that tool is in its operative position, said biasing means comprising an elongated rigid link having an operative connection with said support permitting pivotal and lengthwise movement of the link relative to a point on the support spaced from the axis of said carrier, means pivotally connecting said link with said rocker member at one side of the carrier axis, and a spring connected between said link and said actuator, the points of connection of said link with said rocker member and said spring being located at opposite sides of its operative connections with said support.

6. In combination, a support, a carrier rockably mounted on the support, a pair of circumferentially spaced tools mounted on the carrier, a rockable actuator, a pair of spaced abutments on said carrier positioned on opposite sides of the actuator and having a fixed relation with respect to the tools, and means for biasing the actuator in one direction from a generally central position toward one abutment when the tool corresponding to that abutment is in inoperative position and in the opposite direction toward the other abutment when the tool corresponding to such other abutment is in inoperaive position, said biasing means comprising a link, an elongated pivot pin secured to one end of the link and extending through a portion of the carrier, and an arm rigidly secured to the pivot pin on the opposite side of the carrier from said link, said arm having an elongated slot extending in the same direction from the pivot pin as the link and on the same side of the pivot, a projection fixed with respect to the support in spaced relation to the carrier axis engaged in said slot, and a spring connecting the actuator and the end of said link opposite the end secured to the pivot pin.

7. In a plow assembly, in combination, a beam supporting a pair of plow units spaced apart so that either unit may be located in an operative position and the other in an inoperative position by rocking the beam about its axis, a support for said beam, an actuator member supported to rock in either direction from a generally central upright position and operative to impart corresponding movements to said beam, means for returning said actuator member to its upright position after being rocked in either direction and for predetermining the direction of its next movement comprising a rigid link pivotally supported at one end on said beam and having an operative connection with said support in offset relation to its pivotal axis, and a spring connected between the other end of said link and said actuator member.

8. In combination, a support, a carrier rockably mounted on the support, a pair of circumferentially spaced tools mounted on the carrier, an actuator mounted to rock about the same axis as said carrier, a pair of spaced abutments on said carrier positioned on opposite sides of the actuator and having a fixed relation with respect to the tools, means for biasing the actuator in one direction from a central position toward one abutment when the tool corresponding to that abutment is in inoperative position and in the opposite direction from the central position when the other tool is in inoperative position, and a member swingably mounted on the support so as to be positionable in the path of the actuator after movement of the actuator away from the abutment associated with the tool then in inoperative position so as to block return of the actuator to said abutment and thereby prevent reversal of the bias on the actuator.

9. In an agricultural implement, in combination, a carrier supporting a pair of tools spaced apart so that either tool may be located in an operative position and the other in an inoperative position by rocking the carrier about an axis, a support for said carrier, an actuator member supported to rock about the axis of the carrier in either direction from a generally central upright position and operative to impart corresponding movements to said carrier, means for returning said actuator member to its upright position after being rocked in either direction and for biasing the member for movement alternately in opposite directions, and a lockout member movable into the path of said actuator member to block the return of the latter to upright position and thereby prevent a change in the bias of the actuator member.

10. In an agricultural implement, in combination, a carrier supporting a pair of tools spaced apart so that either tool may be located in an operative position and the other in an inoperative position by rocking the carrier about an axis, a support for said carrier, an actuator member supported to rock about the axis of the carrier in either direction from a generally central upright position and operative to impart corresponding movements to said carrier, means for returning said actuator member to its upright position after being rocked in either direction and for biasing the member for movement alternately in opposite directions, a lever pivotally mounted on said support to swing between active and inactive positions, said lever being operative when in active position to block the return of the actuator member to upright position and thereby prevent a change in the bias of the member, and spring means operative to retain said lever in either position.

11. In an agricultural implement, in combination, a carrier having two operating positions, a support mounting said carrier for rotative movement between said two positions, control mechanism positionable to bias said carrier toward one or the other of its operating positions, said control mechanism including an elongated element pivoted at one end on said carrier to rock about an axis parallel to the rotative axis of the carrier and laterally offset therefrom, and means operative upon movement of the carrier to one position to swing said control element to a position to bias the carrier toward its other position, said means including a pin and slot connection between the control element and said support further offset from the rotative axis of the carrier than the pivot of the element and effective to rock the element in a direction opposite to the direction of movement of the carrier.

NORAL A. NELSON.

REFERENCES CITED

The following references are of record in the file of this patent:

UNITED STATES PATENTS

| Number | Name | Date |
| --- | --- | --- |
| 2,188,413 | Markel | Jan. 30, 1940 |

FOREIGN PATENTS

| Number | Country | Date |
| --- | --- | --- |
| 4,389 | France | May 18, 1849 |
| 519,437 | France | Jan. 24, 1921 |
| 571,354 | Great Britain | Aug. 21, 1945 |
| 236,949 | Switzerland | July 16, 1945 |